(12) United States Patent
Kumamoto

(10) Patent No.: US 6,751,512 B1
(45) Date of Patent: Jun. 15, 2004

(54) DATA RECORDER AND MODULE

(75) Inventor: Mineaki Kumamoto, Mitaka (JP)

(73) Assignee: Teac Corporation, Tokyo (JP)

( * ) Notice: Subject to any disclaimer, the term of this patent is extended or adjusted under 35 U.S.C. 154(b) by 870 days.

(21) Appl. No.: 09/588,486

(22) Filed: Jun. 6, 2000

(30) Foreign Application Priority Data

Jun. 7, 1999 (JP) .......................................... 11-160184

(51) Int. Cl.[7] .................... G06F 12/00; G06F 17/00; G06F 3/00
(52) U.S. Cl. .................... 700/94; 711/154; 711/159; 711/153; 711/160; 710/4; 710/5; 710/6
(58) Field of Search ................................. 710/8, 4, 5, 6; 700/94; 711/154, 159, 133, 160

(56) References Cited

U.S. PATENT DOCUMENTS

| 4,972,099 | A | | 11/1990 | Amano et al. | |
|---|---|---|---|---|---|
| 5,253,120 | A | * | 10/1993 | Endoh | 386/99 |
| 6,128,688 | A | * | 10/2000 | Kondo et al. | 710/306 |
| 6,154,826 | A | * | 11/2000 | Wulf et al. | 711/217 |
| 6,212,580 | B1 | * | 4/2001 | Ihara et al. | 710/8 |

FOREIGN PATENT DOCUMENTS

| EP | 0490864 | 6/1992 |
|---|---|---|
| EP | 0911613 | 4/1999 |
| JP | 1147763 | 6/1989 |
| JP | 04019874 | 1/1992 |
| JP | 5324534 | 12/1993 |
| JP | 06119287 | 4/1994 |
| JP | 11125541 | 5/1999 |

OTHER PUBLICATIONS

"Sicher in Der Spur" Messen Und Prufen, IVA International, DE, vol. 32, No. 4, Apr. 1, 1996, pp. 42–44.

* cited by examiner

*Primary Examiner*—Minsun Oh Harvey
*Assistant Examiner*—Devona E Faulk
(74) *Attorney, Agent, or Firm*—Ladas & Parry

(57) ABSTRACT

A data recorder mounting a plurality of modules for collecting data, the data recorder storing the collected data in a data storage means, the data recorder including data transfer control means for transferring data collected by the modules to the data storage means, module identification data storage means, in which module identification data for identifying any particular one of the modules is stored in an order in which the modules are to be accessed, and output control means for outputting the module identification data in order to the modules from the module identification data storage means in response to data transfer by the data transfer control means, the data recorder capable of accessing one of the modules corresponding to module identification data output to the module by the output control means from the module identification data storage means.

5 Claims, 8 Drawing Sheets

FIG. 5A

| ADDRESS | CHANNEL DATA | |
|---|---|---|
| 0 | 0 0 | → 0 c h |
| 1 | 0 1 | → 1 c h |
| 2 | 0 2 | → 2 c h |
| 3 | 0 3 | → 3 c h |
| 4 | 0 4 | → 4 c h |
| ⋮ | ⋮ | |

FIG. 5B

| ADDRESS | CHANNEL DATA | |
|---|---|---|
| 0 | 0 0 | → 0 c h |
| 1 | 0 2 | → 2 c h |
| 2 | 0 4 | → 4 c h |
| 3 | 0 6 | → 6 c h |
| 4 | 0 8 | → 8 c h |
| ⋮ | ⋮ | |

FIG. 6

| ADDRESS | CHANNEL DATA |
|---|---|
| 0 | 0 0 |
| 1 | 0 0 |
| 2 | 0 1 |
| 3 | 0 2 |
| 4 | 0 3 |
| ⋮ | ⋮ |

⟶ 0 c h
⟶ 0 c h
⟶ 1 c h
⟶ 2 c h
⟶ 3 c h

DATA RECORDER AND MODULE

BACKGROUND OF THE INVENTION

1. Field of the Invention

The present invention relates generally to a data recorder and module, and more particularly, to a data recorder and module in which the data recorder collects data by accessing a plurality of modules in a predetermined sequence.

2. Description of the Related Art

Conventionally, a data recorder mounting data collection modules for collecting certain measured values and recording the measurement data so collected by the modules is known. Such a data recorder is constructed so as to accommodate a plurality of identical or different modules. The modules filter measurement signals received from sensors, convert the signal data to digital data and supply the filtered, digitized data to the data recorder.

The modules are mounted in slots provided on the data recorder. The data recorder collects data by accessing the slot-mounted modules in a predetermined sequence and then sorts the collected data by module and records the data in order.

The order in which the data is collected, or scanned, is determined by the software loaded in the data recorder. The scan is accomplished by Programmed Input/Output transfer, hereinafter referred to as PIO, in which data is transferred between the modules and the data recorder central processing unit, or CPU. The PIO method transfers data from the CPU one word at a time.

The disadvantage with the conventional data recorder is that the data transfer interval is the same for all modules, so detailed data cannot be acquired if the number of modules is large. In addition, as described above the PIO method is used for data transfer, so the data transfer speed is slow.

SUMMARY OF THE INVENTION

Accordingly, it is an object of the present invention to provide an improved and useful data recorder and module in which the above-mentioned disadvantage is eliminated.

The above-described object of the present invention is achieved by a data recorder mounting a plurality of modules for collecting data, the data recorder storing the collected data in a data storage means, the data recorder comprising:

data transfer control means for transferring data collected by the modules to the data storage means;

module identification data storage means, in which module identification data for identifying any particular one of the modules is stored in an order in which the modules are to be accessed; and output control means for outputting the module identification data in order to the modules from the module identification data storage means in response to data transfer by the data transfer control means, the data recorder capable of accessing one of the modules corresponding to module identification data output to the module by the output control means from the module identification data storage means.

Additionally, the above-described object of the present invention is also achieved by the data recorder as described above, wherein the module identification data storage means comprises a rewritable memory so that the module identification data stored therein can be rewritten.

According to the invention described above, the data recorder can access the modules according to the sequence in which the module identification data for identifying particular modules is stored in the module identification data storage means. The module access sequence can be set by simply changing the sequence in which the module identification data is stored in the module identification data storage means. That is, the order in which the modules are accessed can be easily changed simply by rewriting the module identification data stored in the module identification data storage means.

Moreover, the speed with which information is input and output can be increased because the module to be accessed can be specified in response to data transfer initiated by the so-called Direct Access Method, or DMA, control, in which data collected by the modules is transferred directly to the module identification data storage means.

Additionally, the above-described object of the present invention is also achieved by the data recorder as described above, further comprising:

audio input means for inputting audio and converting the input audio to audio data; and control means for attaching the audio data input from and converted by the audio input means to the data collected from the modules and storing the data in the data storage means.

Additionally, the above-described object of the present invention is also achieved by the data recorder as described above, further comprising:

detecting means for comparing module identification data corresponding to the module and module identification data supplied by the data recorder and detecting a matching thereof; and control means for enabling input/output of data to and from the data recorder when the detecting means detects a match between module identification data of the module and module identification data supplied by the data recorder.

Additionally, the above-described object of the present invention is also achieved by the data recorder as described above, further comprising storage means for storing the module identification data corresponding to the module, the module identification data storage means capable of being rewritten from the data recorder.

Additionally, the above-described object of the present invention is also achieved by a data recorder for collecting data from a plurality of modules, the data recorder storing the collected data in a data storage means, the data recorder comprising:

audio input means for inputting audio and converting the input audio to audio data; and control means for attaching the audio data input from and converted by the audio input means to the data collected from the modules and storing the data in the data storage means.

Additionally, the above-described object of the present invention is also achieved by a module capable of being mounted on a data recorder that collects and stores data, the module being accessed by the data recorder, the module comprising:

detecting means for comparing module identification data corresponding to the module and module identification data supplied by the data recorder and detecting a match therebetween; and control means for enabling input/output of data to and from the data recorder when the detecting means detects a match between the module identification data corresponding to the module and the module identification data supplied by the data recorder.

Additionally, the above-described object of the present invention is also achieved by the module as described above, further comprising module identification data storage means for storing the module identification data corresponding to the module, the module identification data storage means capable of being rewritten from the data recorder.

Other objects, features and advantages of the present invention will become apparent from the following detailed description when read in conjunction with the accompanying drawings.

BRIEF DESCRIPTION OF THE DRAWINGS

FIGS. 5A and 5B are diagrams showing sample settings of a RAM according to an embodiment of the present invention;

FIG. 6 is a diagram showing sample settings of a RAM according to an embodiment of the present invention;

DESCRIPTION OF THE PREFERRED EMBODIMENTS

A detailed description will now be given of a data recorder and module according to an embodiment of the present invention, with reference to the accompanying drawings.

Figure 1:
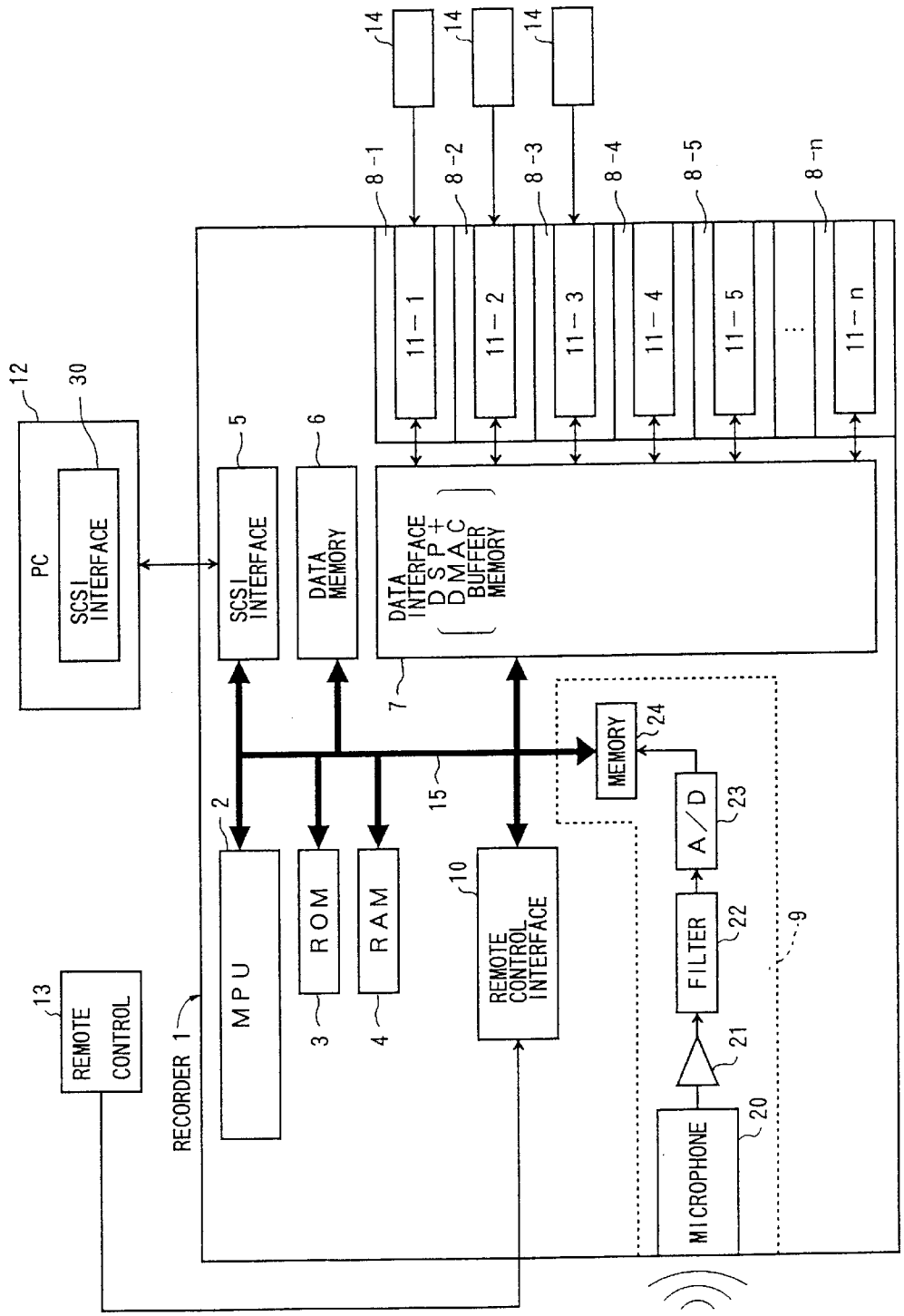
FIG. 1 is a block diagram of a data recorder and module according to an embodiment of the present invention.

FIG. 1 is a block diagram of a data recorder 1 and module according to an embodiment of the present invention.

The data recorder 1 comprises an MPU 2, a ROM 3, a RAM 4, an interface 5, a data memory 6, a data interface circuit 7, slots 8-1 through 8-n, an audio input circuit 9 and a remote control interface 10. Modules 11-1 through 11-n are mounted in the slots 8-1 through 8-n. The interface 5 is connected to a personal computer (hereinafter PC) 12. A remote control 13 is attached to a remote control interface 10.

Sensors 14-1 through 14-3, for example, may be connected to modules 11-1 through 11-3. Modules 11-1 through 11-3 convert the detection signals of sensors 14-1 through 14-3 from analog to digital form and supply the digitized signals to the data interface circuit 7.

The data interface circuit 7 is connected to the MPU 2, the ROM 3, the RAM 4, the interface 5, the data memory 6, the audio input circuit 9 and the remote control interface circuit 10, via a bus 15. The data interface circuit 7 accesses modules 11-1 through 11-3 in order and collects data from modules 11-1 through 11-3 and records the collected data in the memory 6 by module.

The audio input circuit 9 comprises a microphone 20, an amplifier 21, a filter 22, an analog/digital converter 23 and a memory 24.

The microphone 20 converts audio into an electrical audio signal. The audio signal converted by the microphone 20 is then supplied to the amplifier 21. The amplifier 21 amplifies the audio signal converted by the microphone 20.

The audio signal amplified by the amplifier 21 is supplied to the filter 22. The filter 22 removes the noise from the audio signal amplified by the amplifier 21. The audio signal filtered by the filter 22 is supplied to the analog/digital converter 23.

The analog/digital converter 23 converts the audio signal supplied from the filter 22 into digital audio data. The digital audio data output by the analog/digital converter 23 is supplied to the memory 24. The memory 24 comprises a First In First Out, or FIFO, memory that outputs the digital audio data supplied from the analog/digital converter 23 to the bus 15 while sequentially storing the digital audio data.

The digital audio data input from the audio input circuit 9 is then stored in the data memory 6 together with the data collected from the modules 11-1 through 11-n by the data interface circuit 7.

The data stored by module in the data memory 6 by the audio input circuit 9 can be stored with an audio memo attached thereto.

MPU 2 collects data from modules 11-1 through 11-n by executing processing programs stored in the ROM 3 and programming the data interface circuit 7. The RAM 4 is used as an operations storage region when executing the processing programs via the MPU 2.

The interface 5 may, for example, comprise a Small Computer Systems Interface, or SCSI, and is connected to an interface 30 provided on the PC 12, thereby providing an interface with the PC 12.

A more detailed description will now be given of the data interface circuit 7, with reference to the accompanying drawings.

Figure 2:
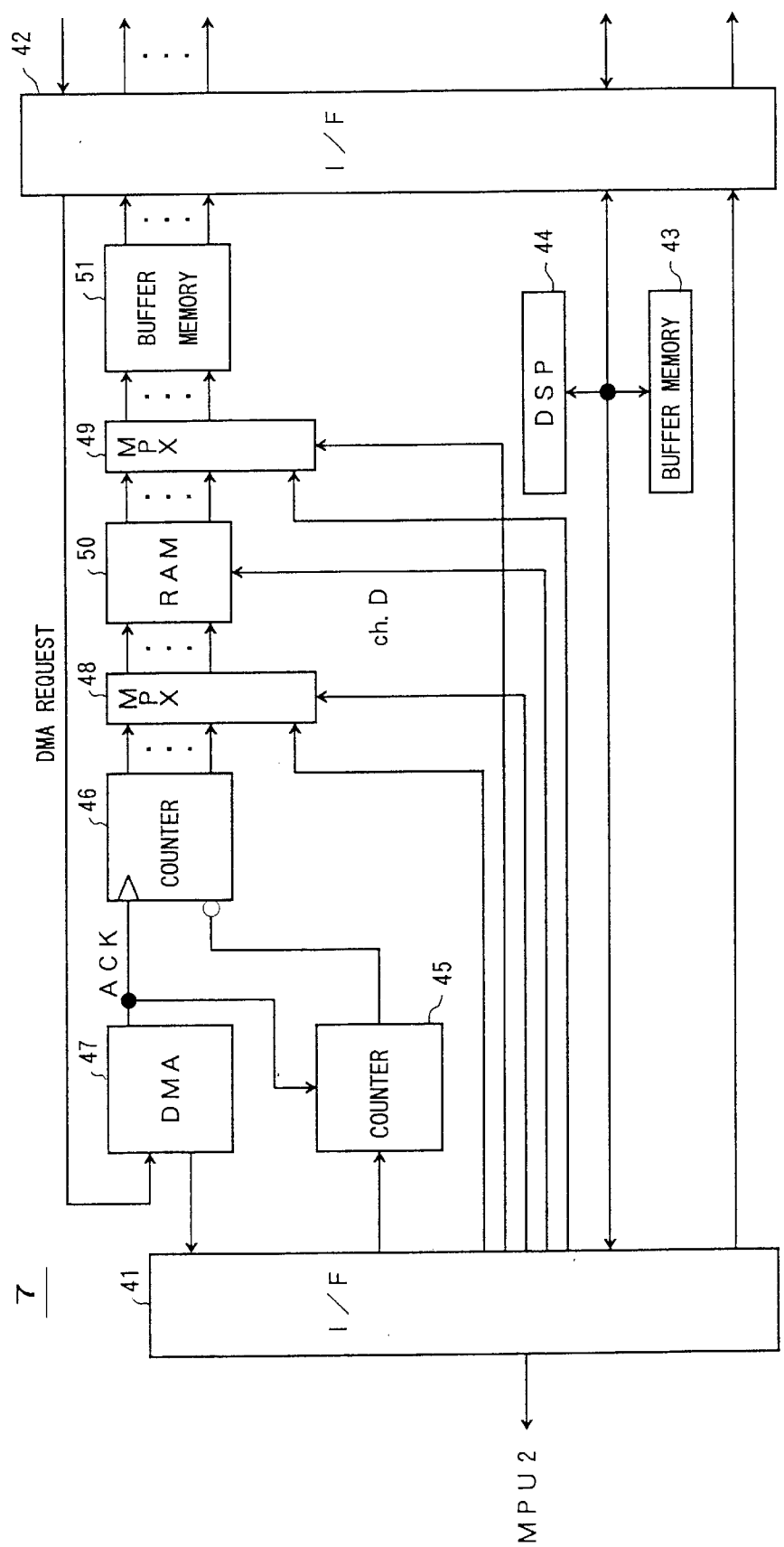
FIG. 2 is a block diagram of a data interface circuit according to an embodiment of the present invention.

FIG. 2 is a block diagram of a data interface circuit according to an embodiment of the present invention.

The data interface circuit 7 comprises interfaces 41, 42, a buffer memory 43, a digital signal processor (DSP) 44, counters 45, 46, a DMA control circuit 47, multiplexers 48, 49, a RAM 50 and another buffer memory 51. The interface 41 is connected to the bus 15, thereby providing an interface between the data interface circuit 7 and the bus 15.

The interface 42 is connected to modules 11-1 through 11-n, thereby providing an interface between the data interface circuit 7 and the modules 11-1 through 11-n. The buffer memory 43 temporarily holds the data collected from the modules 11-1 through 11-n and input via the interface 42. The DSP 44 filters the data collected from the modules 11-1 through 11-n and input via the interface 42.

The number of scans to be carried out is set in the counter 45 by the MPU 2, so that the counter 45 begins a count on a sampling clock in response to a control signal ACK supplied from the DMA control circuit 47. The counter 45 outputs a reset signal when it counts a certain count value previously set by the MPU 2. The reset signal output from the counter 45 is input to a reset terminal of the counter 46.

The counter 46 counts the number of slots. The counter 46 is supplied with the control signal ACK from the DMA control circuit 47 and begins a count in response to the control signal ACK supplied from the DMA control circuit 47. In addition, the reset terminal of the counter 46 is also supplied with the reset signal from the counter 45 and is reset in response to the reset signal from the counter 45.

The count values of the counter 46 are supplied to the multiplexer 48. The multiplexer 48 is connected to the bus 15 via the interface 41, and in response to an instruction from the MPU 2 selects either an output count value from the counter 46 or a specified value from the MPU 2. The value selected by the multiprocessor 48 is supplied to the RAM 50 as an address.

The RAM 50 can be accessed using the value supplied from the multiplexer 48 as an address. Channel data for the purpose of distinguishing modules 11-1 through 11-n is already stored in the RAM 50 in response to an instruction from the MPU 25. The RAM 50 output channel data is supplied to the multiplexer 49. The multiplexer 49 is connected to the bus 15 via the interface 41, and in response to an instruction from the MPU 2 selects either a value specified by the MPU 2 or the RAM 50 channel data.

The data selected by the multiplexer 49 is supplied to the buffer memory 51. The buffer memory 51 comprises an FIFO memory, and holds the data selected by the multiplexer 49 and outputs it in sequence. The output of the buffer memory 51 is supplied to the modules 11-1 through 11-n. A description will now be given of the writing of channel data to the RAM 50.

When writing channel data to the RAM 50, the MPU 2 sets the RAM 50 to write mode and also programs the multiplexer 48 to select an address. In addition, the MPU 2 supplies a specific address to the RAM 50 as an address and supplies channel data to the specified address to the RAM 50.

The reading out of channel data from the RAM 50 is carried out by DMA request from modules 11-1 through 11-n. The DMA control circuit 47 supplies a control signal ACK to the counters 45, 46 when the DMA control circuit 47 is itself supplied with a DMA request. When the counters 45, 46 are supplied with a control signal ACK, the counters 45, 46 are activated and the sampling clock is counted. At this time the MPU 2 causes the multiplexer 48 to select the output value of the counter 46. As a result, the count value on the counter 46 is supplied as an address to the RAM 50.

The RAM 50 outputs the channel data previously stored using the count value from the counter 46 as the address of the channel data. The RAM 50 outputs channel data in order of address using the count values from the counter 46. The channel data output from the RAM 50 is then supplied to the multiplexer 49. At this time, the multiplexer 49 is instructed by the MPU 2 to select the RAM 50 output channel data. As a result, the output from the RAM 50 is supplied to the buffer memory 51.

The buffer memory 51 holds the channel data in the same order in which the channel data is output from the RAM 50 and similarly supplies the channel data to the modules 11-1 through 11-n in the same order in which the channel data is output from the RAM 50. In other words, previously specified channel data is supplied to the modules 11-1 through 11-n in order of address. It should be noted that specifying a particular module to be accessed using the MPU 2 involves using the MPU 2 to program the multiplexer 49 to select the channel data specified by the MPU 2.

A more detailed description will now be given of the modules 11-1 through 11-n, with reference to the accompanying drawings.

Figure 3:
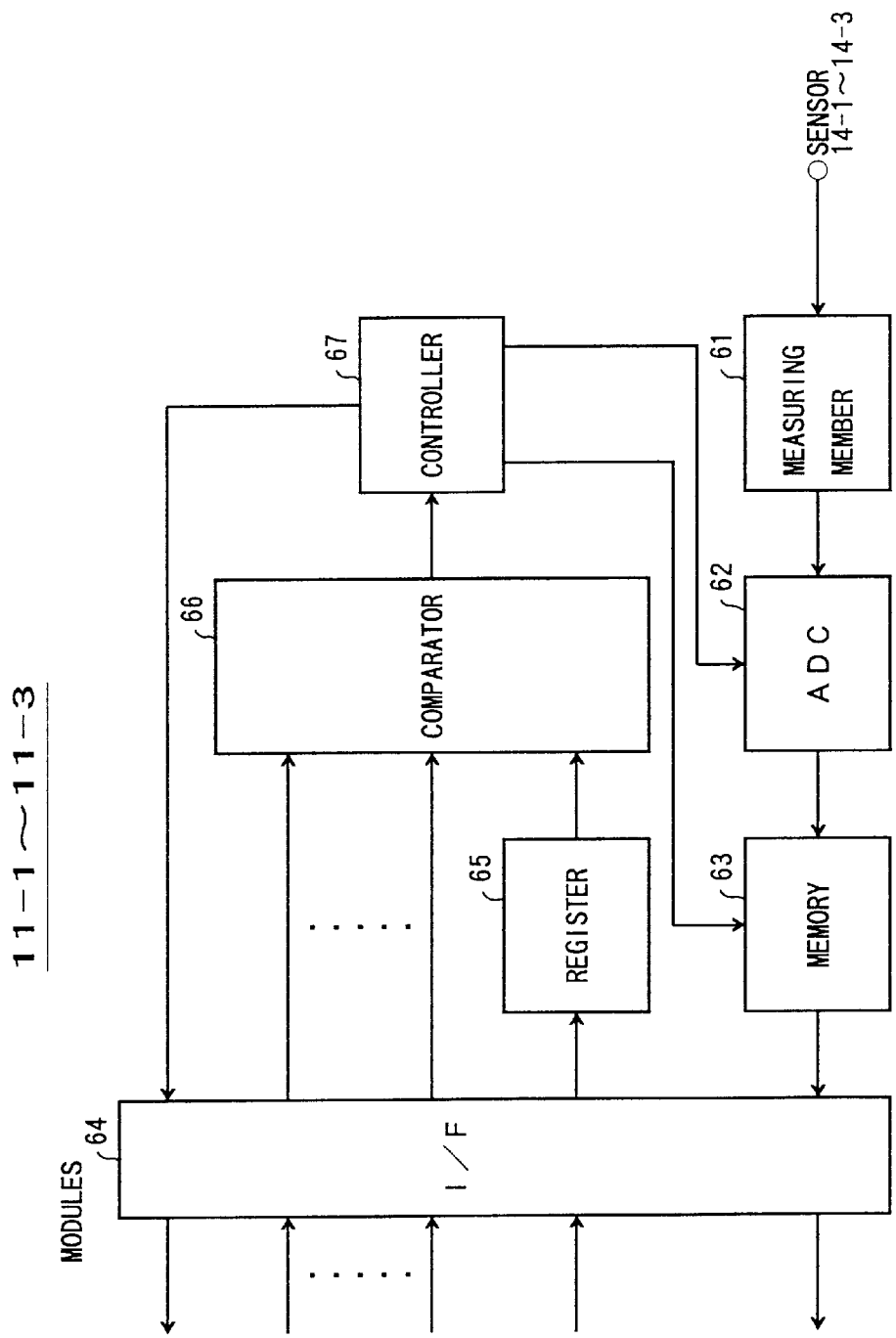
FIG. 3 is a block diagram of a measurement module according to an embodiment of the present invention.

FIG. 3 is a block diagram of a measurement module according to an embodiment of the present invention.

Modules 11-1 through 11-n comprise a measuring member 61, an analog/digital converter 62, a memory 63, an interface 64, a register 65, a comparator 66 and a controller 67.

The measuring member 61 is connected to sensors 14-1 through 14-3 and processes the detection results produced by the sensors 14-1 through 14-3. The signals so processed by the measuring member 61 are supplied to the analog/digital converter 62. The analog/digital converter 62 converts the measurement signals supplied from the measuring member 61 to digital data. At this time the analog/digital converter 62 performs the digital conversion in response to a sampling signal supplied from the controller 67.

The data digitized by the analog/digital converter 62 according to the sampling signal supplied by the controller 67 is supplied to the memory 63. The memory 63 comprises an FIFO memory. The memory 63 stores the digital data supplied by the analog/digital converter 62 in the order in which the data is input and outputs the data in the same order. The digital data held by the memory 63 is supplied to the data interface circuit 7 via the interface 64.

Additionally, the interface 64 is supplied with channel data from the data interface circuit 7. The interface 64 supplies the channel data supplied from the data interface circuit 7 to the comparator 66. Further, the register 65 is connected to the comparator 66. Data for the purpose of identifying the module is stored in the register. The data stored in the register 65 is set by the MPU 2 via the data interface circuit 7.

The comparator 66 compares the channel data supplied from the data interface circuit 7 via the interface 64 to the data held in the register 65, that is, to the data that identifies the module, and determines whether or not the two sets of data match. The results of the match determination are supplied to the controller 67.

If the comparator 66 shows a match between the channel data specified by the data interface circuit 7 and the data identifying the module, then the controller 67 determines that it has been instructed to collect data from the module and supplies data converted by the analog/digital converter 62 and stored in the memory 63 to the data interface circuit 7. Additionally, the controller 67 issues a DMA request to the data interface circuit 7 via the interface 64.

A description will now be given of the output modules 11-4, 11-5.

Figure 4:
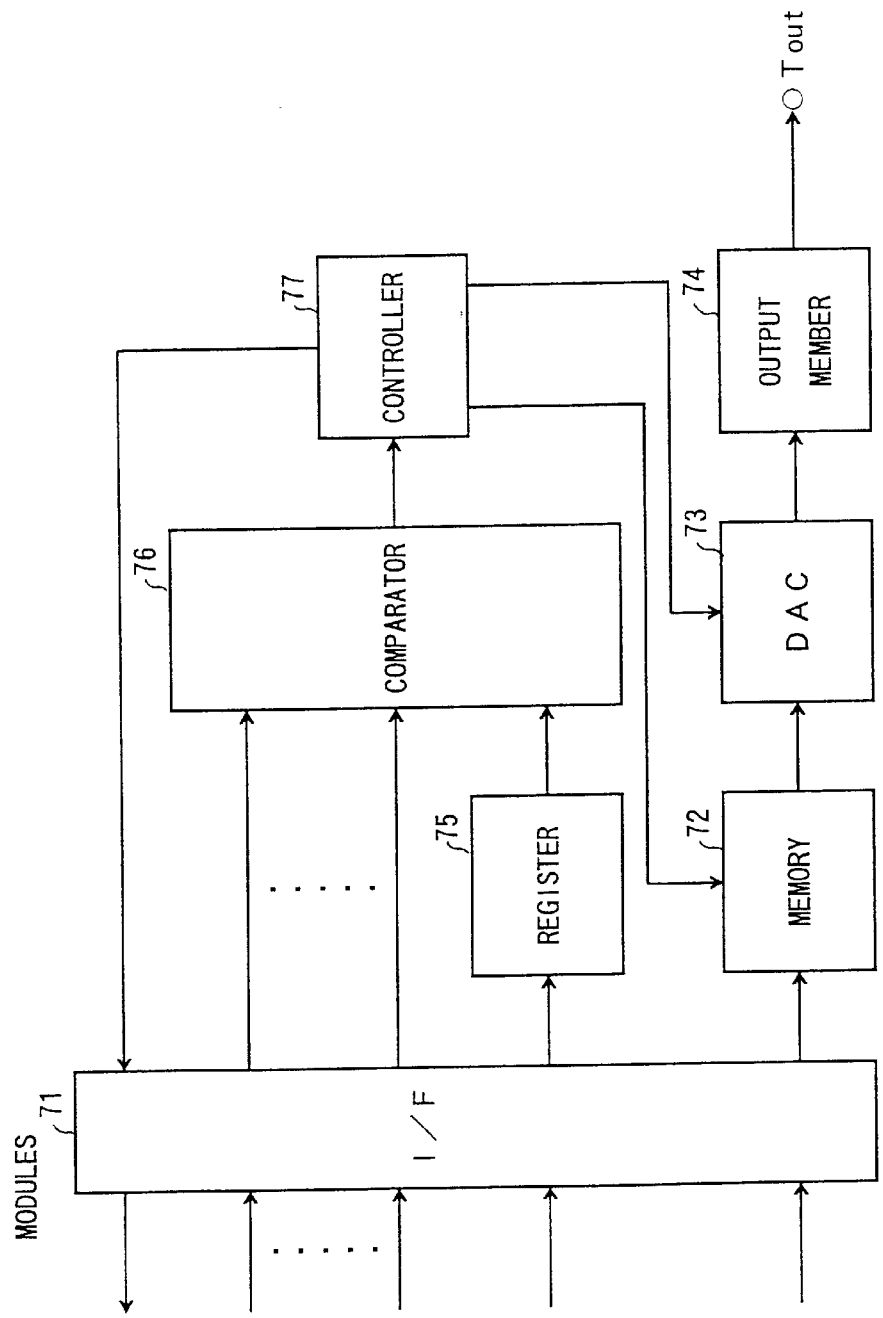
FIG. 4 is a block diagram of an output module according to an embodiment of the present invention.

FIG. 4 is a block diagram of an output module according to an embodiment of the present invention.

As shown in the diagram, output modules 11-4, 11-5 comprise an interface 71, a memory 72, a digital/analog converter 73, an output member 74, a register 75, a comparator 76 and a controller 77.

The interface 71 is supplied from the data interface circuit 7 with data to be output. The interface 71 stores the data supplied from the data interface circuit 7 in the memory 72. The data stored in the memory 72 is supplied to the digital/analog converter 73.

The digital/analog converter 73 converts the digital data stored in the memory 72 into an analog signal. The analog signal so converted by the digital/analog converter 73 is supplied to the output member 74. The output member 74 outputs the analog signal converted by the digital/analog converter 73 to the Tout terminal.

Additionally, the interface 71 is supplied with channel data from the data interface circuit 7. The interface 71 supplies the channel data supplied from the data interface circuit 7 to the comparator 76. The register 75 is connected to the comparator 76. Data for the purpose of identifying the module is stored in the register 75. The data held in the register 75 is set by the MPU 2 via the data interface circuit 7.

The comparator 76 compares the channel data supplied from the data interface circuit 7 via the interface 71 with the data held in the register 75, that is, to the data that identifies the module, and determines whether or not the two sets of data match. The results of the match detection are supplied to the controller 77.

If the comparator 76 shows a match between the channel data specified by the data interface circuit 7 and the data identifying the module, then the controller 77 determines that it has been instructed to transmit data to the module, records in the memory 72 the data supplied from the data interface circuit 7, and supplies a sampling signal to the digital/analog converter 73, causing the digital/analog converter 73 to carry out digital/analog conversion. Additionally, the controller 77 issues a DMA request to the data interface circuit 7 via the interface 71.

A description will now be given of the operation of the present embodiment, with reference to the accompanying drawings.

FIGS. 5A and 5B are diagrams showing sample settings of the RAM according to an embodiment of the present invention. FIG. 6 is a diagram showing other sample settings of the RAM according to an embodiment of the present invention.

FIG. 5A shows sample settings in a case in which modules of channels 0 through 4 are scanned in sequence, FIG. 5B shows a case in which modules of channels, 0, 2, 4, 6 and 8 are scanned selectively. FIG. 6 shows a sample setting in which the module of 0 channel is scanned twice.

As shown in FIG. 5A, the RAM 50 shown in FIG. 2 has channel 0 channel data "00" set to address "0", channel 1 channel data "01" set to address "1", channel 2 channel data "02" set to address "2", channel 3 channel data "03" set to address "3" and channel 4 channel data "04" set to address "4".

The counter 46 counts a count signal ACK supplied from the DMA control circuit 47 with each DMA request from the modules 11-1 through 11-n, and supplies addresses to the RAM 50 in the sequence "0", "1", "2", "3", "4".

Additionally, the counter 45 counts a count signal ACK supplied from the DMA control circuit 47 with each DMA request from the modules 11-1 through 11-n, and resets, or clears, with every fifth count. The counter 46 is cleared at every fifth count by the counter 45, so the output count values of the counter 46 are in the sequence of "0"→"1"→"2"→"3"→"4"→"0"→"1"→ . . . . The counter 46 count values "0"→"1"→"2"→"3"→"4"→"0"→"1"→ . . . are supplied as addresses to the RAM 50.

Accordingly, the channel data is output from the RAM 50 in the order of addresses "0"→"1"→"2"→"3"→"4"→"0"→"1"→ . . . . In other words, the RAM 50 output channel data is "00"→"01"→"02"→"03"→"04"→"00"→"01"→ . . . .

It should be noted that, at this time, channel data "00" is held in the register 65 of module 11-1 for the purpose of identifying the "0" channel, channel data "01" is held in the register 65 of module 11-2 for the purpose of identifying channel "1", channel data "02" is held in the register 65 of module 11-3 for the purpose of identifying channel "2", channel data "03" is held in the register 75 of module 11-4 for the purpose of identifying channel "3", and channel data "04" is held in the register 75 of module 11-5 for the purpose of identifying channel "4".

When the channel data "00" is output from the RAM 50, the modules 11-1 through 11-n compare the channel data "00" output from the RAM 50 with the identification data held in the registers 65, 75. Module 11-1, at which both sets of data match, then causes the analog/digital converter 62 to convert the analog measurement signal from the measurement member 61 to digital data and supplies the digitized data to the data interface circuit 7.

When the channel data "01" is output from the RAM 50, the modules 11-1 through 11-n compare the channel data "01" output from the RAM 50 with the identification data held in the registers 65, 75. Module 11-2, at which both sets of data match, then causes the analog/digital converter 62 to convert the analog measurement signal from the measurement member 61 to digital data and supplies the digitized data to the data interface circuit 7.

When the channel data "02" is output from the RAM 50, the modules 11-1 through 11-n compare the channel data "02" output from the RAM 50 with the identification data held in the registers 65, 75. Module 11-3, at which both sets of data match, then causes the analog/digital converter 62 to convert the analog measurement signal from the measurement member 61 to digital data and supplies the digitized data to the data interface circuit 7.

When the channel data "03" is output from the RAM 50, the modules 11-1 through 11-n compare the channel data "03" output from the RAM 50 with the identification data held in the registers 65, 75. Module 11-4, at which both sets of data match, then causes the digital/analog converter 73 to convert the digital data supplied from the data interface circuit 7 to an analog signal and outputs the analog signal to the Tout terminal.

When the channel data "04" is output from the RAM 50, the modules 11-1 through 11-n compare the channel data "04" output from the RAM 50 with the identification data held in the registers 65, 75. Module 11-5, at which both sets of data match, then causes the digital/analog converter 73 to convert the digital data supplied from the data interface circuit 7 to an analog signal and outputs the analog signal to the Tout terminal.

As described above, data can be collected from or output to the modules 11-1 through 11-n in the order of channel data "00"→"01"→"02"→"03"→"04"→"00"→"01"→ . . . , in other words, in the sequence "module 11-1"→"module 11-2"→"module 11-3"→"module 11-4"→"module 11-5"→"module 11-1" . . . .

As shown in FIG. 5B, the RAM 50 shown in FIG. 2 has channel 0 channel data "00" set at address "0", channel 2 channel data "02" set at address "1", channel 4 channel data "04" set at address "2", channel 6 channel data "06" set at address "3", and channel 8 channel data "08" set at address "4".

Here, as with the sample settings shown in FIG. 5A, the output count value of the counter 46 follows the sequence of "0"→"1"→"2"→"3"→"4"→"0"→"1"→ . . . .

Accordingly, channel data is output from the RAM 50 in the same order as, that is, in the order of addresses "0"→"1"→"2"→"3"→"4"→"0"→"1"→ . . . . That is, the RAM 50 output channel data is "00"→"02"→"04"→"06"→"08"→"00"→"02"→ . . . .

It should be noted that, at this time, channel data "00" identifying channel 0 is held in the register 65 of the module 11-1, channel data "02" identifying channel 2 is held in the register 65 of the module 11-3, channel data "04" identifying channel 4 is held in the register 65 of module 11-5, channel data "06" identifying channel 6 is held in the register 75 of module 11-7 and channel data "08" identifying channel 8 is held in the register 75 of module 11-9.

When the channel data "00" is output from the RAM 50, the modules 11-1 through 11-n compare the channel data "00" output from the RAM 50 with the identification data held in the registers 65, 75. Module 11-1, at which both sets of data match, then causes the analog/digital converter 62 to convert the analog measurement data from the measuring member 61 to digital data and supply the digitized data to the data interface circuit 7.

When the channel data "02" is output from the RAM 50, the modules 11-1 through 11-n compare the channel data "02" output from the RAM 50 with the identification data held in the registers 65, 75. Module 11-3, at which both sets of data match, then causes the analog/digital converter 62 to convert the analog measurement data from the measuring member 61 to digital data and supply the digitized data to the data interface circuit 7.

When the channel data "04" is output from the RAM 50, the modules 11-1 through 11-n compare the channel data "04" output from the RAM 50 with the identification data held in the registers 65, 75. Module 11-5, at which both sets of data match, then causes the digital/analog converter 73 to convert the digital data from the data interface circuit 7 to analog signals and output the analog signals from the Tout terminal.

When the channel data "06" is output from the RAM 50, the modules 11-1 through 11-n compare the channel data "06" output from the RAM 50 with the identification data held in the registers 65, 75. Module 11-7, at which both sets of data match, then causes the digital/analog converter 73 to convert the digital data from the data interface circuit 7 to analog signals and output the analog signals from the Tout terminal.

When the channel data "08" is output from the RAM 50, the modules 11-1 through 11-n compare the channel data "08" output from the RAM 50 with the identification data held in the registers 65, 75. Module 11-9, at which both sets of data match, then causes the digital/analog converter 73 to convert the digital data from the data interface circuit 7 to analog signals and output the analog signals from the Tout terminal.

As described above, data can be collected from or output to the modules 11-1 through 11-n in the order of channel data "00"→"02"→"04"→"06"→"08"→"00"→"02"→ . . . , in other words, in the sequence "module"→"11-1"→"module 11-3"→"module 11-5"→"module 11-7"→"module 11-9"→"module 11-1" . . . .

In other words, the modules can be accessed in the order of the channel data set in the RAM 50.

As shown in FIG. 6, the RAM 50 shown in FIG. 2 has channel 0 channel data "00" set at address "0", channel 0 channel data "00" set at address "1", channel 1 channel data "01" set at address "2", channel 2 channel data "02" set at address "3", and channel 3 channel data "03"set at address "4".

Here, as with the sample settings shown in FIGS. 5A and 5B, the counter 46 output count value is "0"→"1"→"2"→"3"→"4"→"0"→"1"→ . . . .

Accordingly, channel data is output from the RAM 50 in the same order as, that is, in the order of addresses "0"→"1"→"2"→"3"→"4"→"0"→"1"→ . . . . That is, the RAM 50 output channel data is "00"→"00"→"01"→"02"→"03"→"00"→"00"→ . . . .

It should be noted that, at this time, channel data "02" identifying channel 0 is held in the register 65 of the module 11-1, channel data "01" identifying channel 1 is held in the register 65 of the module 11-2, channel data "02" identifying channel 2 is held in the register 65 of module 11-3, channel data "03" identifying channel 3 is held in the register 75 of module 11-4 and channel data "04" identifying channel 4 is held in the register 75 of module 11-5.

As shown in FIG. 6, by setting the same channel data "00" to successive addresses "0" and "1" of RAM 50, the same module 11-1 can be accessed successively, so multisampling is possible.

A description will now be given of the operation timing of the data interface circuit 7, with reference to the accompanying drawings.

Figure 7:
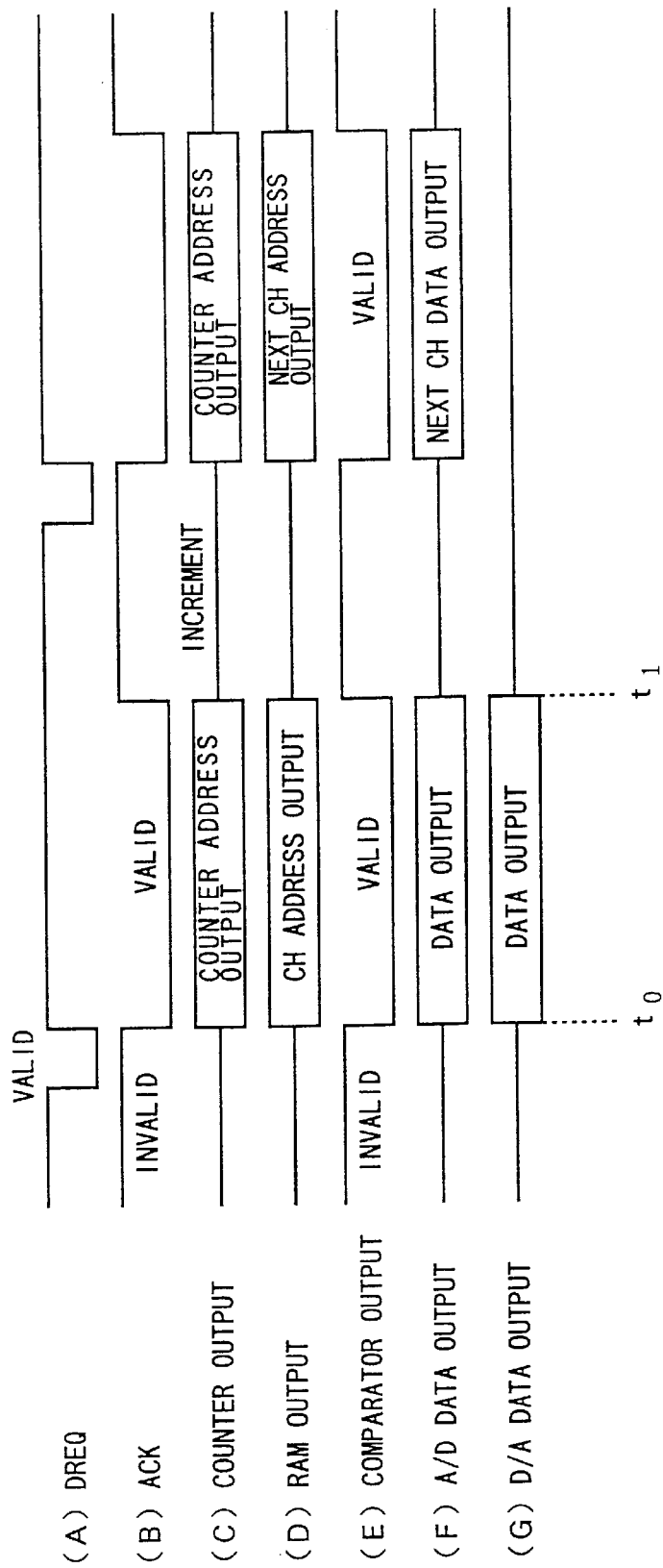
FIG. 7 is a diagram for the purpose of explaining an operation according to an embodiment of the present invention.

FIG. 7 is a diagram for the purpose of explaining an operation according to an embodiment of the present invention. (A) represents the DMA requests DMAQ from modules 11-1 through 11-n, (B) represents the count signal ACK supplied to the counters 45, 46 from the DMA control circuit 47, (C) represents the counter 46 output, (D) represents the RAM 50 output timing, (E) represents the output from the comparators 66, 76 of the modules 11-1 through 11-n, (F) represents the output of the analog/digital converter 62 and (G) represents the output of the digital/analog converter 73.

As shown in the diagram, when at a time t0 the DMA request DREQ supplied to the DMA control circuit 47 becomes valid, then the count signal ACK supplied to the counter 46 from the DMA control circuit 47 becomes valid. When the count signal ACK supplied to the counter 46 from the DMA control circuit 47 becomes valid, then the count address is supplied to the RAM 50.

As shown in the diagram, the RAM 50 outputs a channel address. Additionally, channel addresses are supplied to modules 11-1 through 11-n. When modules 11-1 through 11-n are supplied with channel addresses the comparators thereat are also supplied 66, 76.

When the addresses match, the output of the comparators 66, 76 becomes valid. When the output of comparators 66, 67 becomes valid, the converted data is output from the memory 63, the digital data is stored in the memory 72, digital/analog conversion is carried out and data is output from the digital/analog converter 73.

Next, when at a time t1 the count signal ACK supplied from the DMA control circuit 47 to the counter 46 becomes invalid, the count address on the counter 46 is incremented.

It should be noted that the data obtained from modules 11-1 through 11-n is DMA transmitted to the data memory 6 via the data interface circuit 7, with the data being held at each sampling cycle.

Figure 8:
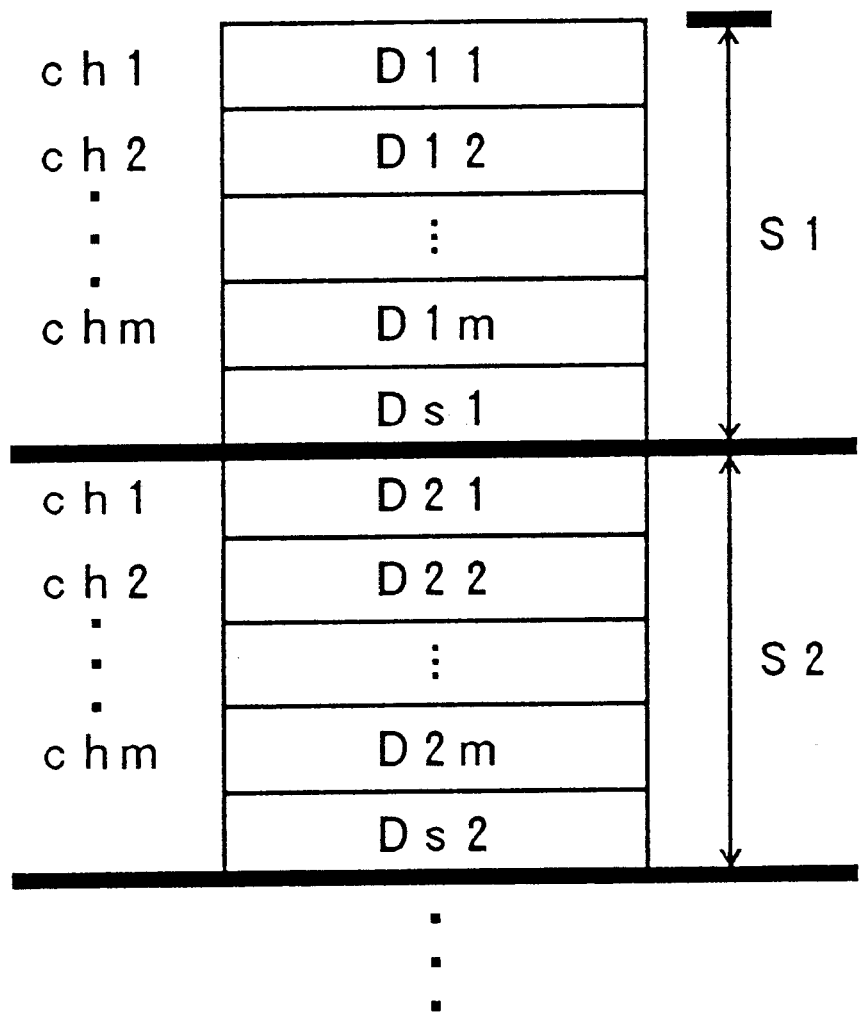
FIG. 8 is a diagram showing the data structure of the memory for the data according to an embodiment of the present invention.

FIG. 8 is a diagram showing the data structure of the memory for the data according to an embodiment of the present invention.

FIG. 8 shows a case in which an audio memo from the audio input circuit 9 is attached to, for example, the data of the first channel through the m channel.

By attaching an audio memo to the data D1-1 through D1-m obtained from the first channel through the m channel during a first sampling period S1, audio data Ds1 is attached after the data D1-1 through D1-m.

Further, by attaching an audio memo to data D2-1 through D2-m obtained from the first channel through the m channel during a second sampling period S2, audio data Ds2 is attached after the data D2-1 through D2-m.

As described above, using the audio input circuit 9 an audio memo can by synchronized with and attached to the data D1-1 through D1-m as well as to the data D2-1 through D2-m.

It should be noted that although the present embodiment describes a case in which the sequence of the modules to be accessed is set by the order in which the channel data is stored in the RAM 50, in actuality the sequence in which the modules are to be accessed can be easily set by changing the settings of the registers 65, 75 of the modules 11-1 through 11-n.

As described above, according to the present invention, the modules can be accessed according to the sequence in which the module identification data is stored in the identification data storage means, and accordingly, the sequence in which the modules are accessed can be set as desired simply by changing the order in which the module identification data is stored in the module identification data storage means.

The above description is provided in order to enable any person skilled in the art to make and use the invention and sets forth the best mode contemplated by the inventor of carrying out the invention.

The present invention is not limited to the specifically disclosed embodiments, and variations and modifications may be made without departing from the scope and spirit of the present invention.

The present application is based on Japanese Priority Application No. 11-160184 filed on Jun. 7, 1999, the entire contents of which are hereby incorporated by reference.

What is claimed is:

1. A data recorder mounting a plurality of modules for collecting data, the data recorder storing the collected data in a data storage means, the data recorder comprising:

data transfer control means for transferring data collected by the modules to the data storage means;

module identification data storage means, in which module identification data for identifying any particular one of the modules is stored in an order in which the modules are to be accessed; and output control means for sequentially outputting the module identification data read from the module identification data storage means by performing a counting operation in response to a response signal to a data transfer request made by said transfer control means, supplying a count value as an address to said module identification data storage means, and reading the module identification data of the modules from said module identification data storage means, the data recorder capable of accessing one of the modules corresponding to the module identification data output to the module by the output control means from the module identification data storage means.

2. The data recorder as claimed in claim 1, wherein the module identification data storage means comprises a rewritable memory so that the module identification data stored therein can be rewritten.

3. The data recorder as claimed in claim 1, further comprising:

audio input means for inputting audio and converting the input audio to audio data; and control means for attaching the audio data input from and converted by the audio input means to the data collected from the modules and storing the data in the data storage means.

4. The data recorder as claimed in claim 1, further comprising:

detecting means for comparing module identification data corresponding to the module and module identification data supplied by the data recorder and detecting a matching thereof; and control means for enabling input/output of data to and from the data recorder when the detecting means detects a match between module identification data of the module and module identification data supplied by the data recorder.

5. The data recorder as claimed in claim 4, further comprising storage means for storing the module identification data corresponding to the module, the module identification data storage means capable of being rewritten from the data recorder.

* * * * *